United States Patent [19]

Isakson

[11] Patent Number: 4,566,190

[45] Date of Patent: Jan. 28, 1986

[54] RECIPROCATING BLADE CUTTING DEVICE

[76] Inventor: Stig A. Isakson, 5751 SW. 54th, Portland, Oreg. 97221

[21] Appl. No.: 697,729

[22] Filed: Feb. 4, 1985

Related U.S. Application Data

[63] Continuation of Ser. No. 524,929, Aug. 22, 1983, abandoned.

[51] Int. Cl.⁴ .............................................. B23D 51/10
[52] U.S. Cl. ........................................ 30/373; 30/392; 83/699
[58] Field of Search .......... 30/371, 373, 374, 392–394; 83/699

[56] References Cited

U.S. PATENT DOCUMENTS

| | | |
|---|---|---|
| 1,855,371 | 4/1932 | Ungar ................................ 30/394 X |
| 2,735,685 | 2/1956 | Karr ................................... 30/392 X |
| 2,808,082 | 10/1957 | Moretti et al. ......................... 30/374 |
| 3,260,290 | 7/1966 | Happe et al. ........................... 30/375 |
| 3,360,021 | 12/1967 | Mejia ................................ 30/392 X |
| 3,412,767 | 11/1968 | Green ................................... 30/392 |

Primary Examiner—Douglas D. Watts
Attorney, Agent, or Firm—Robert L. Harrington

[57] ABSTRACT

A reciprocating blade cutting device wherein a reciprocating chuck and blade combination locates the cutting edge of the blade at the forward most point of the housing. Guide surfaces are provided and extend rearwardly from this forward most point along each side of the housing. The guide surfaces are adapted to engage a wall and to guide the saw blade for cutting alongside the wall. The chuck is adapted to fix the saw blade between either of two positions required for directional cutting as established by the two guide surfaces.

10 Claims, 13 Drawing Figures

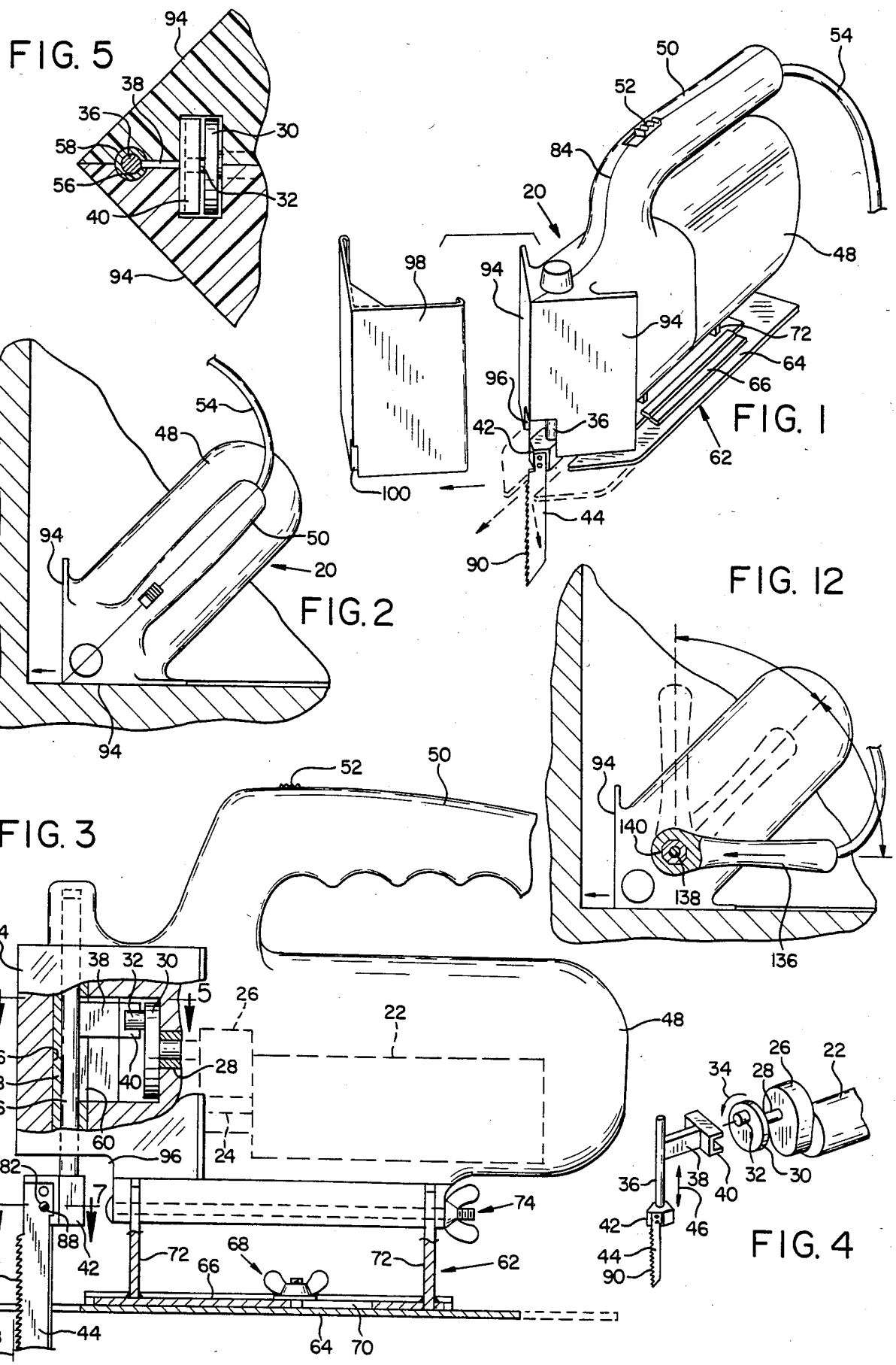

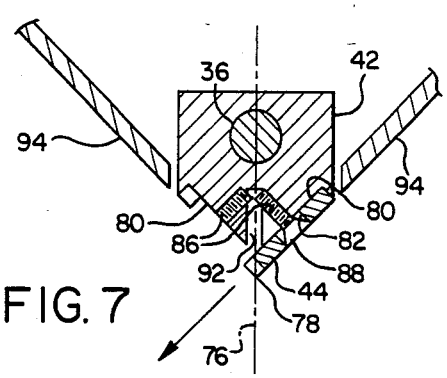
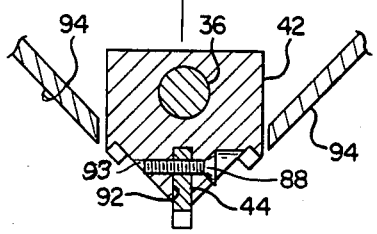
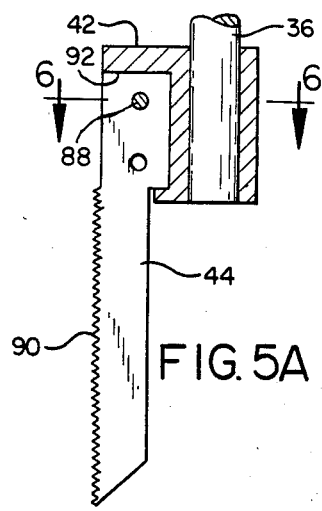
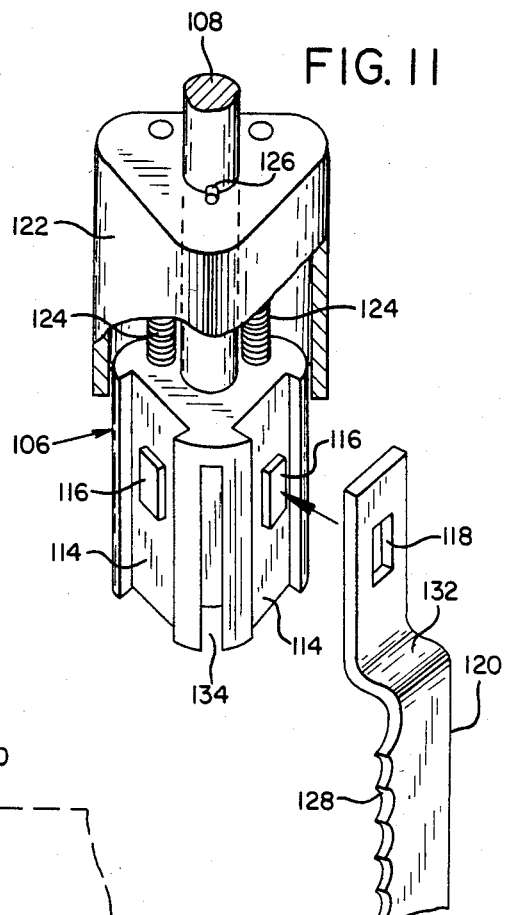
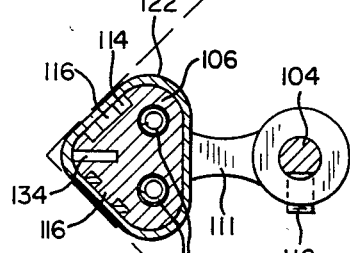
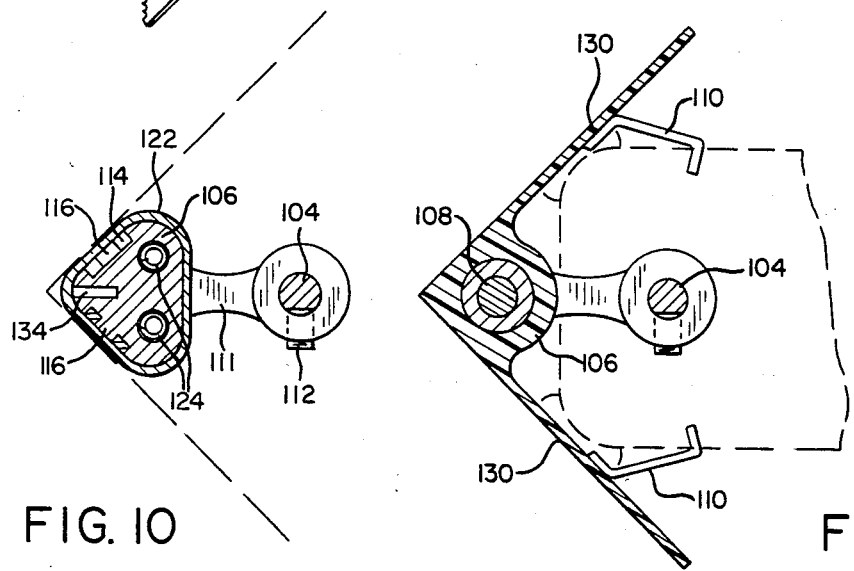

RECIPROCATING BLADE CUTTING DEVICE

This application is a continuation of application for U.S. Patent by Stig A. Isakson, Ser. No. 06/524,929, filed Aug. 22, 1983 now abandoned.

FIELD OF INVENTION

This invention relates to reciprocating saws used in carpentry and the like, often referred to as sabre saws, and more particularily to a blade holding structure and a guide structure for sabre saws that enables the saws to cut a groove immediately adjacent to a wall without damaging the wall.

BACKGROUND OF INVENTION

The reciprocating or sabre saw has been in existence for many years. It is generally regarded as a very versatile tool that can be used in places where other more conventional saws are not usable. However one situation that frequently occurs is where a cut is desired up flush against a wall, e.g., for cutting away a floor or shelf fastened to the wall. The typical sabre saws are not capable of making this cut because the reciprocating mechanism and the saw blade itself are confined within the housing perimeter and thus the blade simply cannot be positioned in a cutting operation flush up against the wall. Even if the saw were to be modified to provide an offset extension for the blade as suggested by certain prior art patents, e.g., Happe et all, U.S. Pat. No. 3,260,290, the reciprocating motion of the blade and the various structure reciprocated with the blade would come in contact with the wall and gouge it. In many of the situations referred to, gouging the wall is not acceptable and furthermore the interference with the operation of the saw can be damaging.

SUMMARY OF THE INVENTION

The present invention is believed to substantially advance the utility of a sabre saw in instances where a straight cut that is flush with a wall is desired. The present invention, in a preferred embodiment, comprises the establishment of a point forward of the saw body from which a 90° angle can be drawn to include the entire saw body. A saw blade holder, or chuck, as it is commonly called, is mounted to the drive shaft of the motor in such a way as to position the holder adjacent the apex of the angle but within the angle in a manner to provide reciprocating vertical motion. The saw blade holder is designed to receive, in locking engagement, a saw blade in a first position that is aligned with the saw body and in second and third positions with the saw blade aligned along each of the sides of the established angle. Planar guide surfaces carried by the saw body extend along the sides of the established angle. In cutting along a wall the blade is mounted in one of the second and third positions, and the planar guide surface corresponding to that side is pressed against the wall to precisely align the cutting blade with the wall. Cutting is achieved by sliding the guide surface along the wall.

DETAILED DESCRIPTION INCLUDING DRAWINGS

The invention and the structure of the preferred embodiment thereof will be, more clearly understood by reference to the following detailed descriptions and drawings wherein;

FIG. 1 is a perspective view of a sabre saw in accordance with the present invention;

FIG. 2 is a top view of the saw of FIG. 1 shown in operation;

FIG. 3 is a side view of the sabre saw of FIGS. 1 and 2 with portions broken away;

FIG. 4 is an exploded schematic view illustrating the transfer mechanism transferring the horizontal rotary motion of the motor to vertical reciprocating motion required for sawing;

FIG. 5 is a view taken on section lines 5—5 of FIG. 3;

FIG. 5a is a sectional side view of the chuck of FIG. 3 with the blade in the center position, as viewed on section lines 5a—5a of FIG. 6;

FIG. 6 is a view taken on section lines 6—6 of FIG. 5a;

FIG. 7 is a view taken on section line 7—7 of FIG. 3;

FIG. 8 is a side view of an alternate embodiment of the invention;

FIG. 9 is a view taken on section lines 9—9 of FIG. 8;

FIG. 10 is a view taken on section lines 10—10 of FIG. 8;

FIG. 11 is a perspective view of the chuck and saw blade being mounted to the chuck of FIG. 8;

FIG. 12 is a further alternate embodiment of the invention.

Referring to FIGS. 3 and 4 of the drawings, a sabre saw 20 includes a motor 22 (dash lines in FIG. 3) that rotatably drives a primary drive shaft 24. A gear reduction box 26 interconnects the rotational power of the primary drive shaft to drive a secondary drive shaft 28. A disc 30 is carried on the end of the secondary drive shaft and a pin 32 fixed to the periphery of the disc is driven by the secondary drive shaft in a circular motion as illustrated by arrow 34 in FIG. 4.

Including now also FIG. 5, a vertical shaft 36 is mounted through a post 38 to a channel member 40. Pin 32 driven by the motor 22 resides in this channel which allows free sliding side to side movement while trapping the vertical component of the circular motion of the pin to drive the shaft 36 up and down in a reciprocating motion as illustrated by arrow 46. A chuck 42 on the lower end of shaft 36 is designed to carry a blade 44 which in a similar fashion is driven up and down in a reciprocating motion.

Referring now also to FIG. 1 of the drawings, the components just described (except for the bottom end of shaft 36, the chuck 42 and the blade 44) are contained in a housing 48. The housing includes a handle 50 on which is mounted a switch 52 to turn on electrical power to the motor 22 through electrical wire 54.

The housing 48 is preferably molded plastic that is formed in two halves that are fastened together as indicated by the separation line 84 in FIG. 1. The head portion of the housing i.e., the portion forward of the motor as illustrated, has a vertical, tubular seat 56 that receives a guide cylinder 58. The vertical shaft 36 is designed to ride up and down in the guide cylinder and a slot 60 in the guide cylinder provides the necessary clearance for the up and down movement of the post 38.

A surface guide 62 is attached to the bottom of the housing 48. A bifurcated bottom skid 64 is fastened by a releasable clamp 68 (a bolt and wing nut) to a bracket 66. A slot 70 in the bracket allows adjustment forward and backward of the bottom skid, the purpose of which will be explained in a later section. FIG. 1 shows the skid in it's retracted position in full lines and it's forward position in dash lines. This is reversed in FIG. 3. The bracket 66 includes front and rear legs 72 that are bolted to the housing by a second releasable clamp 74 (bolt and wing nut).

The specifics of the chuck 42 and saw blade 44 are illustrated in FIGS. 3, 4, 5a, 6 and 7. The chuck 42, as will be explained, is designed to mount a flat saw blade 44 in any one of three positions (two side positions and a center position) provided on the chuck. FIGS. 3, 4 and 7 illustrate the blade 44 mounted on one of the side postions and FIGS. 5a and 6 illustrate the blade 44 mounted in the center position. Referring first to the side position mounting of FIGS. 3, 4 and 7, the chuck 42 as previously explained, is fixed to the lower end of the vertical shaft 36. The front portion of the chuck 42 is triangular shaped and forms a symetrical 90° angle around the center line 76 of the housing. A point 78 (shown as a line in FIG. 3) is established as the apex of the angle from which the sides of the angle sweep back to encompass the entire housing 48. The front faces of the chuck 42 are provided with insets 80 that accomodate the thickness of the saw blade 44. A screw hole 82 in the blade 44 is mated with a threaded screw hole 86 in the chuck. A screw 88 passes through screw hole 82 and is threadably engaged in screw hole 86 in the chuck to locate the outer front edges of the cutting teeth 90 of the blade along a vertical line passing through the apex 78. (see FIG. 3). Also, the outer side of the blade 44 is swept rearwardly along the corresponding side of the 90° angle as seen in FIG. 7. It will be understood that the blade can be similarily mounted to the other face of the chuck in the same manner described above. Whereas the location of the blade at the two positions overlap, this is not a problem as only one blade will ever be used in the chuck at any one time.

Referring now to FIGS. 5a and 6, the center position in the chuck is provided by a slot 92. The screw 88 passes through a second opening 93 in the blade and is threadably engaged with a continuation of the opening 93 on the other side of the slot 92. It will be appreciated from the above description that with a cutting blade located at either of the side positions on the chuck, the cutting function of the blade can be located flush up against a wall as when it is desired to sever a shelf mounted on a wall. However, that function can hardly be achieved with any degree of accuracy without a guide as will now be described.

Referring to FIGS. 1, 2, 3 and 7, the housing head is provided with planar guide surfaces 94. These guide surfaces 94 are precisely located along the two sides of the 90° angle as illustrated in FIG. 7. A cutout 96 in the lower apex portion of the junction of the guide surfaces allows for the reciprocating motion of the chuck. Whereas this cutout 96 provides relief for both sides and center cutting of the blade, it exposes more of the moving components than necessary for a simple center cut which will be most of the use for the saw. Thus a safety shield 98 may be provided to clip on to the guide surfaces 94 of the housing head. A simple center slot 100 allows for exposure of the blade for this center cutting operation.

Operation of the Cutting Device

It will be apparent that a "normal" use of the saw may be achieved by locating the cutting blade 44 in the center position of the chuck 42 (FIG. 6). The bottom skid 64 is slid forward by first releasing clamp 68 to permit the shifting of the skid 64 forward as allowed by slot 70 in bracket 66. The clamp 68 is then retightened. The safety shield is snapped into place and the saw is ready for center cut operation.

When it is desired to cut along a wall as illustrated in FIG. 2, it is necessary to remove the safety shield and position the cutting blade 44 at the side position illustrated in FIG. 7. The bottom skid is retracted to the position shown in FIG. 1 and the saw is operated by running the guide surface 94 along the wall as shown in FIG. 2. With the guide surfaces 94, the blade 44, and reciprocating motion of the shaft 36, all aligned vertically, the abutment of the guide surface 94 against the wall will provide for a cutting line flush up against the wall without gouging that wall.

Alternate Embodiments

FIGS. 8 through 11 illustrate an alternate embodiment of the invention. A saw 102 is a conventional sabre saw having a reciprocating shaft 104 that is designed to hold a cutting blade in a conventional sawing operation. The saw 102 is retrofitted with an attachable housing head containing the components of the present invention. The housing head is formed of molded plastic with a guide cylinder molded into the head in the same manner as described for the embodiment of FIG. 3. A chuck 106 is attached to the lower end of a shaft 108 within the guide cylinder. A bracket 109 and clips 110 fasten the head to the housing of the saw and a connecting bar from the chuck is fastened to the shaft of the housing by screw 112 to produce reciprocating motion of shaft 108 with shaft 104.

Referring now to FIGS. 10 and 11, the chuck 106 includes a quick release blade holding feature. The insets 114 of the chuck include bosses 116 that are adapted to seat in boss openings 118 of the blade 120. A cover 122 is slideably mounted on the shaft 108 to be seated over the chuck for operation as shown in FIG. 8. Springs 124 between the cover and the chuck hold the cover in the seated position and the blade is securely held thereby within the chuck. Removal of the blade requires a simple manual lifting of the cover (overcoming the spring pressure and as limited by pin 126).

It will be understood that it is important that the cutting teeth 128 of the blade 120 extend from the apex and along a side edge as determined by the guide surface 130 of the housing head. The thickness of the cover 122 requires the chuck to be set back from the guide surfaces to avoid protrusion of the cover beyond these guide surfaces. Thus the blade 120 includes a bend 132 in the blade in order to align the cutting teeth with these guide surfaces. Different blades will of course be required for each of the two sides of the chuck and for the center position as provided by slot 134.

FIG. 12 illustrates a handle 136 that can be located for alignment with either side cutting or conventional center cutting. The handle is mounted on a splined shaft 138 and held in place by a nut 140. Changing the handle position is accomplished by loosening the nut 140, raising the handle to disengage it from the splines, relocating the handle on the splines as desired and retightening the nut.

The present invention satifies the important need heretofore unsatisfied by conventional saws, i.e., the need to sever objects flush up against a flat wall. In the sawing operation there is generally a desire to accomplish a straight cut in line with the wall but without marking the wall. Furthermore, such a sawing operation often involves sawing into a corner as illustrated in FIG. 2. It will be appreciated from the above disclosures that the invention satisfies these needs by establishing a forward point from which a 90° angle or less can be drawn to encompass the entire saw body. The reciprocating mechanism, including chuck and saw blade is designed to locate the cutting teeth at this point and directed forwardly along one leg of the angle. Most important is the guide surface of the housing head that enables the operator to generate the cutting operation of the cutting teeth along the juncture of the wall and the object. The position of the teeth at the established point further allows the operator to cut up to the corner. All of this cutting operation is achieved without gouging or otherwise marking the wall. Once having an appreciation for the concept of the invention others skilled in the art will become aware of other modifications, variations and improvements to the embodiment illustrated herein. The scope of the invention is not limited to those embodiments but is determined by reference to the claims appended hereto.

I claim:

1. A reciprocating blade saw for cutting along a wall and into a corner joining two walls comprising; a housing, a motor contained in the housing, a shaft carried by the housing and adapted for reciprocating motion, and transfer means for transferring the work generated by the motor to reciprocally drive the shaft, a chuck having first and second saw blade receiving positions mounted on one end of the shaft, a planar saw blade having a linear cutting edge, said saw blade adapted to be mounted on the chuck to be reciprocated in line with the cutting edge and for cutting in a cutting direction perpendicular to the cutting edge, fastening means selectively fastening the saw blade to the chuck at the first and second saw blade receiving positions with the plane of the saw blade at the first and second positions respectively defining first and second planes intersecting at an angle no greater than 90° with the linear cutting edge of the blade at each of the first and second positions substantially located on the line of intersection, said housing being substantially completely contained within said angle of the intersecting planes, and first and second planar guide surfaces on said housing substantially in the first and second planes respectively defined by the first and second positions of the cutting blade for guiding the saw blade along a wall.

2. A reciprocating blade saw as defined in claim 1 wherein; a cylindrical seat is provided in the housing, a guide cylinder is contained by the housing within the cylindrical seat, and said reciprocal shaft is slideably contained in the guide cylinder, and said transfer means includes a follower member that converts rotary motion from the motor's drive shaft to reciprocating motion, and a post member interconnecting the follower member with the reciprocal shaft to reciprocally drive the shaft in response to work generated by the motor through it's drive shaft.

3. A reciprocating blade saw as defined in claim 2 wherein the cylindrical seat is located rearwardly of and adjacent to the line of intersection.

4. A reciprocating blade saw as defined in claim 1 wherein the fastening means includes means for mounting a saw blade at a third saw blade receiving position for cutting along a center line relative to the housing.

5. A reciprocating blade saw as defined in claim 4 wherein; a surface guide is provided on the housing having a bifurcated bottom skid adapted for sliding along a surface being cut and which straddles and guides the saw blade in a center cutting operation, and further including retracting means for retracting the surface guide inside the angle formed by the intersecting planes during a side cutting operation.

6. A reciprocating blade saw as defined in claim 1 wherein; the chuck has a triangular shaped forward portion, said triangular shape conforming to said established angle of the intersecting planes and having sides that lie in the first and second planes, each of said sides of the chuck having insets to receive the shank of a common straight saw blade whereby when mounted said straight saw blade is located alternately in the first and second planes.

7. A reciprocating blade saw as defined in claim 6 wherein; the triangular portion of the chuck is provided with a center slot for receiving the common straight saw blade for cutting along the center line of the saw.

8. An attachment for mounting onto a conventional reciprocating blade saw having a reciprocating shaft, said attachment comprising; a housing body having a cylindrical seat formed therein, a guide cylinder fixedly contained within said seat and a reciprocating shaft slideably contained within said guide cylinder and having one end projected out of the guide cylinder and out of the housing body, a pair of guide surfaces on the housing body defining intersecting planes having an established angle therebetween, the extension of which angle encompasses the attachment and blade saw to which it is attached, and a chuck fastened to the exposed end of the reciprocating shaft, a planar saw blade having a linear cutting edge adapted to be mounted on the chuck to be reciprocated in line with the cutting edge and for cutting in a cutting direction perpendicular to the cutting edge, means for mounting a saw blade to the chuck in the plane defined by one of said guide surfaces with the cutting edge positioned along the line of intersection of the planes, means for mounting the housing body to the reciprocating blade saw and means for fastening the reciprocating shaft of the housing attachment to the reciprocating shaft of the reciprocating blade saw to be reciprocated therewith.

9. A reciprocating blade saw as defined in claim 1 wherein; the chuck includes a pair of forwardly directed side faces, each of said side faces adapted to receive the shank of a saw blade, a cover slideably carried by the shaft for limited sliding movement on and off of the chuck, said cover adapted to securely hold a saw blade on a side face of the chuck and permitting quick removal of the blade by manually sliding the cover off of the chuck.

10. A reciprocating blade saw as defined in claim 4 including a removable safety shield removably mounted to the housing of the saw and covering the reciprocating chuck with the blade mounted for cutting along the center line.

* * * * *